US009205374B2

(12) United States Patent
Black et al.

(10) Patent No.: US 9,205,374 B2
(45) Date of Patent: Dec. 8, 2015

(54) DEHUMIDIFIERS WITH IMPROVED FLUID MANAGEMENT AND ASSOCIATED METHODS OF USE AND MANUFACTURE

(75) Inventors: Richard A. Black, Bellingham, WA (US); William Bruders, Sedro Woolley, WA (US); Kevin A. Wolfe, San Marcos, CA (US); Larry White, Mount Vernon, WA (US); Aaron Matthew Kiesser, Mount Vernon, WA (US); Brett Bartholmey, Bellingham, WA (US)

(73) Assignee: Dri-Eaz Products, Inc., Burlington, WA (US)

( * ) Notice: Subject to any disclaimer, the term of this patent is extended or adjusted under 35 U.S.C. 154(b) by 474 days.

(21) Appl. No.: 13/599,826

(22) Filed: Aug. 30, 2012

(65) Prior Publication Data

US 2013/0047662 A1 Feb. 28, 2013

Related U.S. Application Data

(60) Provisional application No. 61/529,887, filed on Aug. 31, 2011, provisional application No. 61/547,613, filed on Oct. 14, 2011.

(51) Int. Cl.
*F25D 17/06* (2006.01)
*B01D 53/26* (2006.01)
(Continued)

(52) U.S. Cl.
CPC .............. *B01D 53/265* (2013.01); *F24F 1/025* (2013.01); *F24F 3/1405* (2013.01); *B01D 2259/455* (2013.01); *F24F 2003/144* (2013.01)

(58) Field of Classification Search
CPC ............ F24F 2003/14; F24F 2003/144; F24F 3/1405; F25D 21/14

USPC ......... 62/89, 92, 93, 126, 186, 271, 272, 285, 62/498
See application file for complete search history.

(56) References Cited

U.S. PATENT DOCUMENTS 2,959,400 A 11/1960 Simpelaar
3,265,129 A 8/1966 Bawabe et al.
(Continued)

FOREIGN PATENT DOCUMENTS

JP 07243666 A 9/1995
JP 08313013 11/1996
(Continued)

OTHER PUBLICATIONS

"DrizAir 2400 Dehumidifier: Introduced in Aug. 1998 . . . ", from web site, <http://www.dri-eaz.com/2400.htm>, Jan. 10, 2000, 2 pages.
(Continued)

*Primary Examiner* — Melvin Jones
(74) *Attorney, Agent, or Firm* — Perkins Coie LLP

(57) ABSTRACT

Dehumidifiers with improved airflow and fluid management features are disclosed herein. A dehumidifier configured in accordance with a particular embodiment includes a housing, a moisture removal component, and an airflow director. The housing at least partially defines an airflow path extending therethrough. The moisture removal component is positioned within the housing along a portion of the airflow path, and the airflow path enters the moisture removal component in a first direction. The airflow director adjacent to the moisture removal component extends in a plane that is generally parallel to the first direction.

23 Claims, 10 Drawing Sheets

(51) Int. Cl.
*F24F 1/02* (2011.01)
*F24F 3/14* (2006.01)

(56) References Cited

U.S. PATENT DOCUMENTS

| | | | |
|---|---|---|---|
| 3,866,674 A | | 2/1975 | Tramuta et al. |
| 4,099,928 A | | 7/1978 | Norback |
| 4,758,385 A | | 7/1988 | Acker et al. |
| 4,761,966 A | | 8/1988 | Stark |
| 4,971,137 A | | 11/1990 | Thompson |
| 5,022,241 A | * | 6/1991 | Wilkinson ............. 62/271 |
| 5,183,106 A | | 2/1993 | Stancliffe et al. |
| D333,890 S | | 3/1993 | Oberdorfer-Bogel |
| D334,258 S | | 3/1993 | Oberdorfer-Bogel |
| 5,301,515 A | | 4/1994 | Iritani et al. |
| 5,303,561 A | | 4/1994 | Bahel et al. |
| D394,499 S | | 5/1998 | Bettag et al. |
| 5,785,723 A | | 7/1998 | Beran et al. |
| 5,913,360 A | | 6/1999 | Stark |
| 5,950,439 A | | 9/1999 | Peterson et al. |
| D419,230 S | | 1/2000 | Ciccone |
| 6,029,464 A | | 2/2000 | Kil et al. |
| 6,182,747 B1 | | 2/2001 | Stark |
| D445,116 S | | 7/2001 | Evans et al. |
| D446,612 S | | 8/2001 | Kohler |
| 6,478,855 B1 | | 11/2002 | Okano |
| 6,542,062 B1 | | 4/2003 | Herrick |
| D482,171 S | | 11/2003 | Vui et al. |
| D508,735 S | | 8/2005 | Klein |
| D529,019 S | | 9/2006 | Lim |
| 7,228,693 B2 | | 6/2007 | Helt |
| 7,281,389 B1 | | 10/2007 | O'Brien et al. |
| D577,426 S | | 9/2008 | Huang |
| D581,111 S | | 11/2008 | DiPasquale |
| D581,608 S | | 11/2008 | Dammkoehler et al. |
| 7,581,408 B2 | | 9/2009 | Stark |
| D617,437 S | | 6/2010 | Matsuzaki |
| 7,856,840 B2 | | 12/2010 | Yoon et al. |
| D634,414 S | | 3/2011 | Wolfe et al. |
| D641,844 S | | 7/2011 | Kim et al. |
| D641,845 S | | 7/2011 | Breit et al. |
| 8,056,182 B2 | | 11/2011 | Day |
| 8,091,868 B2 | | 1/2012 | Robb et al. |
| 8,127,397 B2 | | 3/2012 | Hess et al. |
| 8,227,648 B2 | | 7/2012 | Wegerer et al. |
| 2001/0045098 A1 | | 11/2001 | Derryberry et al. |
| 2005/0218535 A1 | | 10/2005 | Maisotsenko et al. |
| 2005/0235673 A1 | | 10/2005 | Sueoka et al. |
| 2006/0053819 A1 | * | 3/2006 | Wu et al. ............. 62/298 |
| 2006/0086125 A1 | | 4/2006 | Sueoka et al. |
| 2006/0260790 A1 | | 11/2006 | Theno et al. |
| 2008/0202131 A1 | | 8/2008 | Brody |
| 2009/0025323 A1 | * | 1/2009 | Fernandes ............. 52/302.1 |
| 2009/0165485 A1 | | 7/2009 | Stark |
| 2010/0224565 A1 | | 9/2010 | Dunne et al. |
| 2010/0269526 A1 | | 10/2010 | Pendergrass et al. |
| 2011/0061408 A1 | | 3/2011 | Schnelle |
| 2011/0073290 A1 | | 3/2011 | Chang et al. |
| 2014/0150488 A1 | | 6/2014 | Black et al. |

FOREIGN PATENT DOCUMENTS

| | | |
|---|---|---|
| JP | 2001182965 A | 7/2001 |
| JP | 2005241052 A | 9/2005 |
| JP | 2007054700 A | 3/2007 |
| WO | WO-2006135172 A2 | 12/2006 |

OTHER PUBLICATIONS

Dri-Eaz, "DrizAir 2400 Dehumidifier," undated, 4 pages.
Heat Pipe Technology, Inc., "Dinh Dehumidifier Heat Pipes, Commercial and Industrial Applications," undated, 8 pages.
Hodnell, Charles, "Wrap-Around Heat Pipe Makes Its Debut!" Hot Line Newsletter, vol. 15, No. 1, Mar. 1995, 2 pages.
New Release, "Dri-EAZ Products Introduces Rotomolded Dehumidifier", Aug. 27, 1998, from web site, <http://www.dri-eaz/newsreleases898.html>, 3 pages.
U.S. Appl. No. 29/400,737, filed Aug. 31, 2011, Wolfe et al.
International Search Report and Written Opinion for International Patent Application No. PCT/US2012/053199, Applicant: Dri-Eaz Products, Inc., mailed Dec. 26, 2012, 12 pages.
U.S. Products, "The Flood King—Portable Water Extractor for Restoration," Instant 212° F. Heat at the Wand Tip, http://www.usproducts.com/products/restoration/floodking.htm, accessed Aug. 17, 2011, 1 page.
"DrizAir 1200 Dehumidifier", DRI-EAZ Complete Drying Solutions for Restorative Drying Professionals 2000 brochure, pp. 4 and 19, D23/359 patent shoe, 2000.
U.S. Appl. No. 29/438,879, filed Dec. 4, 2012, Kulp.

* cited by examiner

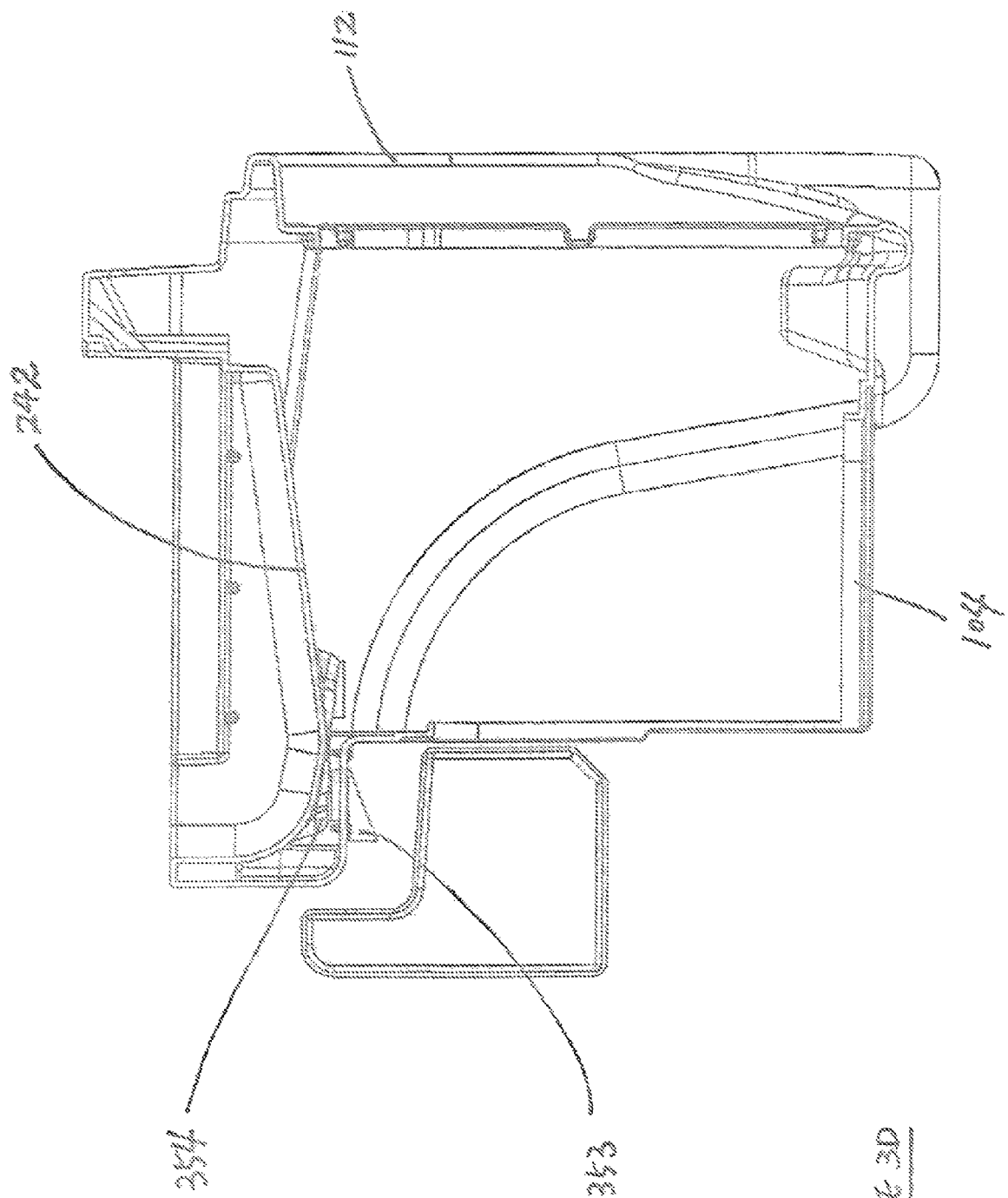

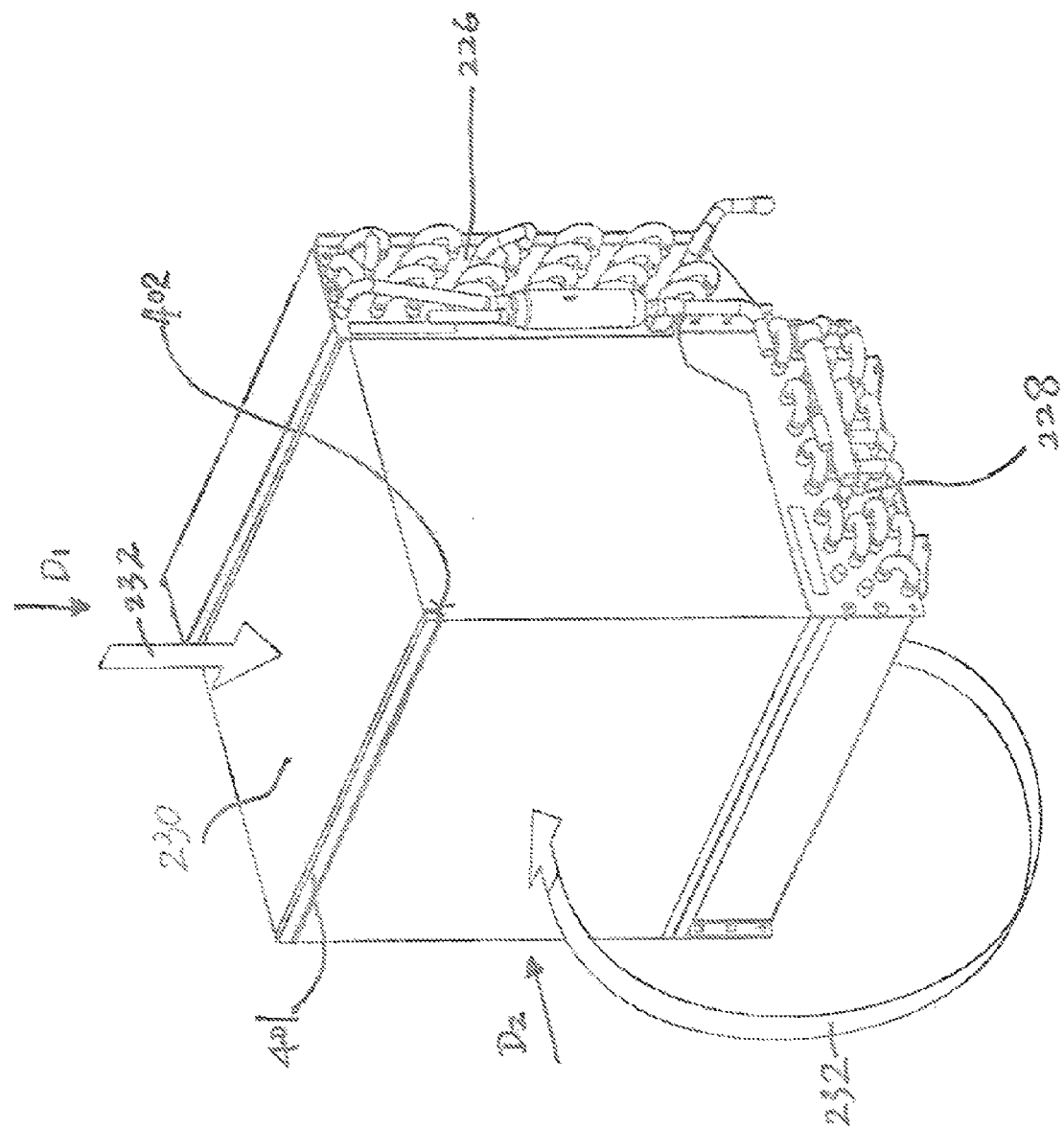

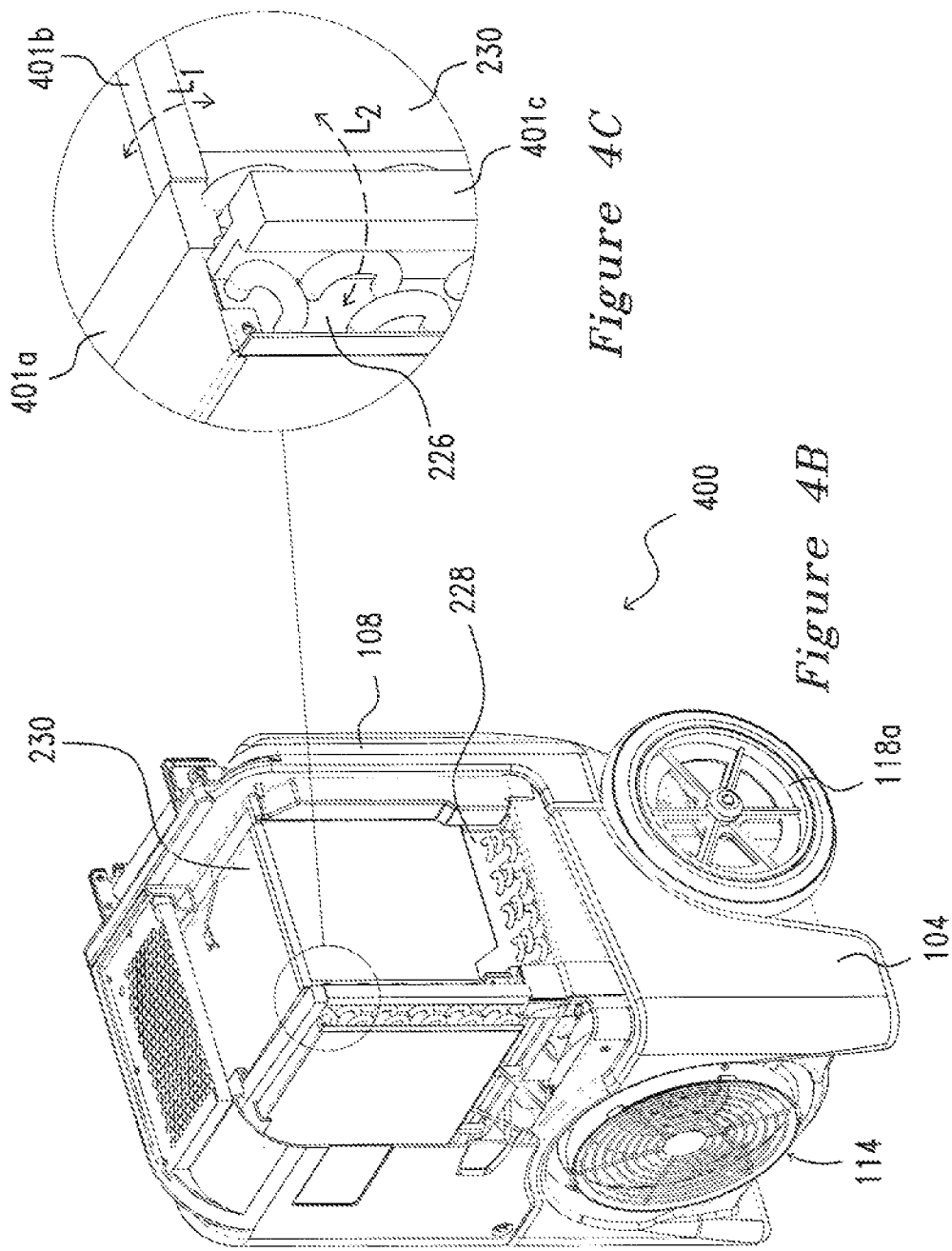

DEHUMIDIFIERS WITH IMPROVED FLUID MANAGEMENT AND ASSOCIATED METHODS OF USE AND MANUFACTURE

CROSS-REFERENCE TO RELATED APPLICATION

The present application claims priority to U.S. Provisional Application No. 61/529,887, filed Aug. 31, 2011, and U.S. Provisional Application No. 61/547,613, filed Oct. 14, 2011, of which are incorporated herein by reference.

TECHNICAL FIELD

The present disclosure is directed generally to dehumidifiers, assemblies, and methods, and more specifically, to dehumidifiers with improved airflow and fluid management features.

BACKGROUND

Dehumidifiers are used for removing moisture from air. A conventional dehumidifier typically directs airflow across several components of a refrigeration cycle. The components of the refrigeration cycle cool the airflow below the dew-point temperature so that water vapor in the airflow is condensed to liquid and removed from the airflow. Dehumidifiers are useful in many different applications. For example, dehumidifiers are frequently used in residential applications to reduce the level of humidity in the air for health reasons, as humid air can cause unwanted mold or mildew to grow inside homes. Moreover, many homeowners operate dehumidifiers to decrease the humidity of the air in their homes for comfort reasons, as extremely humid air can be uncomfortable. Dehumidifiers are also frequently used in commercial or industrial applications, for example to dry the air in water damage restoration projects. The drier air helps contractors restore buildings or other structures that have been flooded or suffered other types of water damage.

BRIEF DESCRIPTION OF THE DRAWINGS

FIG. 3D is a cross-sectional side view of a lower housing portion of a dehumidifier configured in accordance with an embodiment of the disclosure.

FIG. 4A is an isometric view of a heat exchanger of a dehumidifier configured in accordance with an embodiment of the disclosure.

FIG. 4B is an isometric view of a dehumidifier configured in accordance with an embodiment of the disclosure.

FIG. 4C is an enlarged illustration of a portion of the dehumidifier shown in FIG. 4B.

DETAILED DESCRIPTION

The present disclosure is directed generally to dehumidifiers with improved airflow and fluid management features, and associated methods of manufacture and operation, for removing water or other fluids (e.g., liquids) from buildings or other structures. The following description identifies specific details with reference to FIGS. 1-4C to provide a thorough understanding of various embodiments of the disclosure. Other details describing well-known structures or processes often associated with dehumidifiers, however, are not described below to avoid unnecessarily obscuring the description of various embodiments of the disclosure. Moreover, although the following disclosure sets forth several embodiments of different aspects of the disclosure, other embodiments can have different configurations and/or different components than those described in this section. In addition, further embodiments of the disclosure may be practiced without several of the details described below, while still other embodiments of the disclosure may be practiced with additional details and/or features.

Figure 1A:
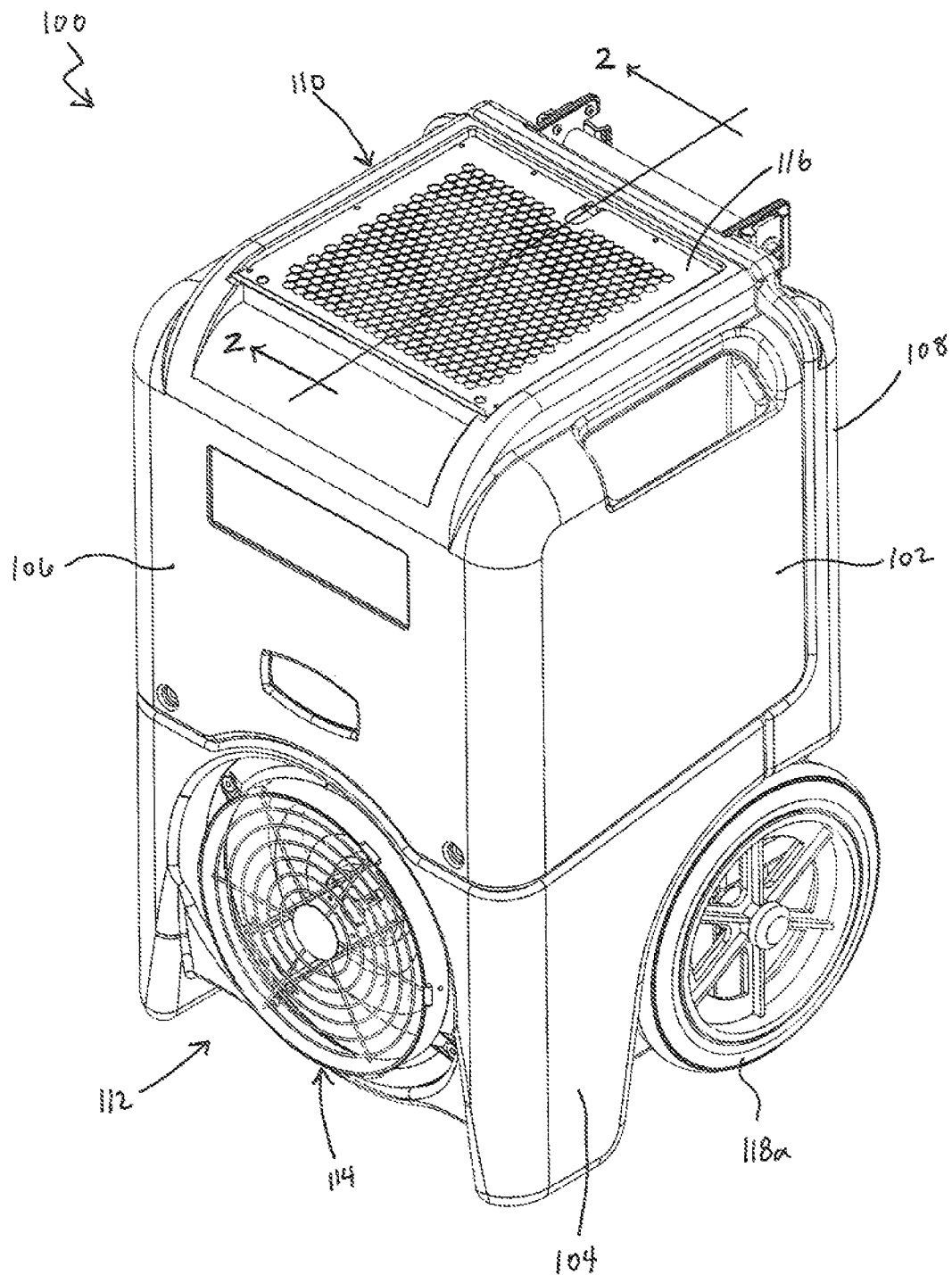
FIG. 1A is a front isometric view and FIG. 1B is a rear isometric view of a dehumidifier configured in accordance with an embodiment of the disclosure.
Figure 1B:
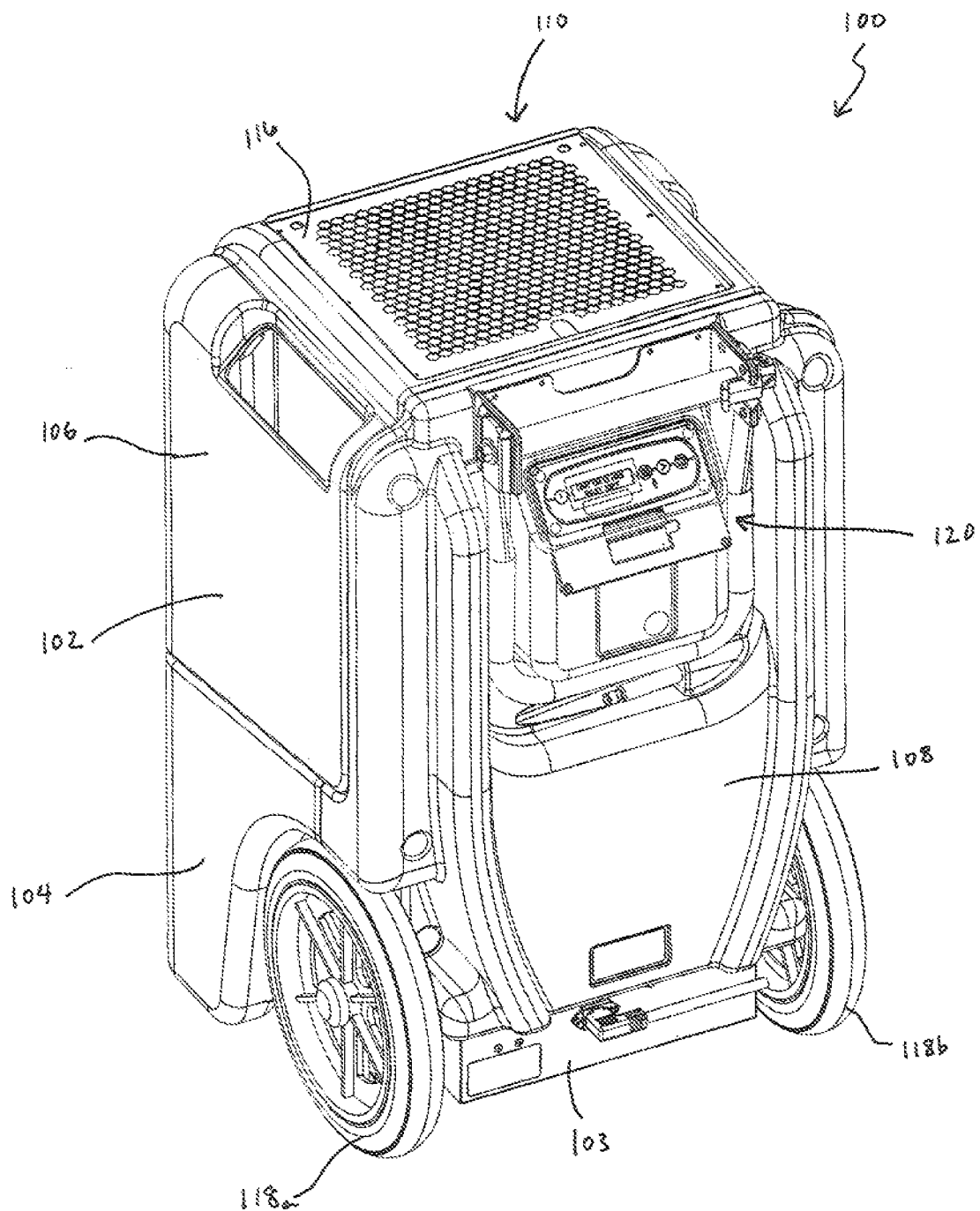

The present disclosure is directed generally to dehumidifiers having improved airflow and fluid management features. FIG. 1A, for example, is a front isometric view and FIG. 1B is a rear isometric view of a dehumidifier 100 configured in accordance with one embodiment of the disclosure. Referring to FIGS. 1A and 1B together, the dehumidifier 100 includes a cover or housing 102. The housing is composed of three coupled pieces or portions: a first or lower housing portion 104, a second or upper housing portion 106, and a third or rear housing portion 108. The lower housing portion 104 is additionally coupled to a support structure or frame 103 (FIG. 1B). The housing 102 is configured to allow air to flow through the dehumidifier 100. For example, the upper housing portion 106 defines or carries an inlet (or a housing entrance) 110 and the lower housing portion 104 defines or carries an outlet (or a housing exit) 112 (FIG. 1A). An air mover 114 (FIG. 1A) positioned at the outlet 112 draws inlet airflow into the dehumidifier 100 at the inlet 110. Intermediate airflow travels through the dehumidifier 100 to pass through, adjacent to, or otherwise in thermal communication with one or more moisture removing components. The air mover 114 discharges outlet airflow from the dehumidifier 100 via the outlet 112 of the lower housing portion 104. Additional details of the moisture removing components and the airflow through the dehumidifier 100 are described in detail below with reference to FIG. 2.

In a particular embodiment illustrated in FIGS. 1A and 1B, the dehumidifier 100 also includes a shroud or screen 116 removably attached to the upper housing portion 106. The screen 116 retains a filter (not visible in FIGS. 1A and 1B) at the inlet 110 of the upper housing portion 106 and includes a plurality of openings to allow the air to flow through the filter. The filter can include any suitable filter medium for use with a dehumidifier to at least partially prevent dust, debris, or other foreign objects from entering the dehumidifier 100. In certain embodiments, the screen 116 and filter can be removable from the upper housing portion 106. The rear housing portion 108 also carries a control panel 120 (FIG. 1B) including one or more electronic controls to allow a user to operate the dehumidifier 100.

The dehumidifier 100 further includes wheels 118 (identified individually as a first wheel 118a and a second wheel 118b) extending from the support structure 103. The wheels 118 are designed to allow a user to easily move the dehumidifier 100 to different desired locations. The dehumidifier 100 shown in FIGS. 1A and 1B can accordingly be a portable dehumidifier that a single user can easily roll or otherwise move. In the illustrated embodiment, the lower housing portion 104 is shaped to generally follow the contour of the wheels 118. In other embodiments, however, the lower housing portion 104 can extend between the wheels 118 and the support structure 103, or the lower housing portion 104 can at least partially extend around and enclose the wheels 118. As will also be appreciated by one of ordinary skill in the relevant art, the dehumidifier 100 illustrated in FIGS. 1A and 1B can include any type of dehumidifier, including, for example, a portable, commercial, industrial, residential, and/or personal dehumidifier.

Figure 2:
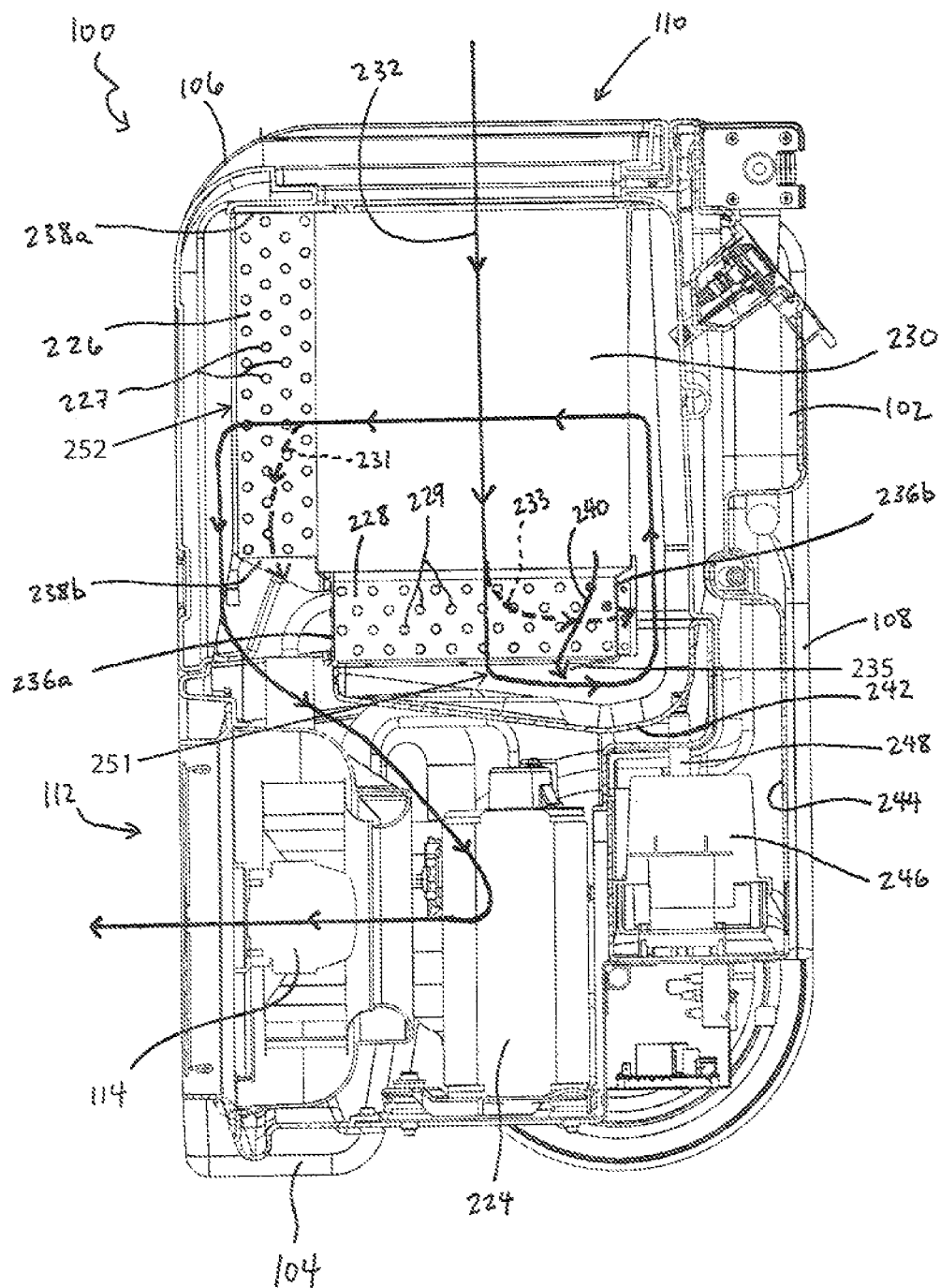
FIG. 2 is a cross-sectional side view taken substantially along lines 2-2 of FIG. 1A.

FIG. 2 is a cross-sectional side view of the dehumidifier 100 taken substantially along lines 2-2 of FIG. 1A illustrating several of the internal features of the dehumidifier 100. For example, the dehumidifier 100 includes several moisture removing components that form elements of a refrigeration cycle for removing moisture from air flowing through the dehumidifier 100. In a particular embodiment, the dehumidifier 100 includes a compressor 224 that delivers a hot compressed gas refrigerant to a condenser 226. The condenser 226 can include a tube-and-fin heat exchanger and/or coils. In the illustrated embodiment, the condenser 226 includes multiple rows or series of coiled condenser tubing 227. In the illustrated embodiment, for example, the condenser 226 includes four rows or series of coiled condenser tubing 227. In other embodiments, however, the condenser 226 can include more or fewer than four rows of coiled condenser tubing 227. The hot compressed gas flows through the coiled condenser tubing 227 and the condenser 226 condenses the hot gas refrigerant to a hot liquid refrigerant and delivers the hot liquid refrigerant to an expansion device (not shown). The expansion device can cool and/or expand the hot liquid refrigerant to reduce the temperature and pressure of the refrigerant. The expansion device delivers the cooled refrigerant to a moisture removal device or evaporator 228. The evaporator 228 can include a tube-and-fin heat exchanger and/or coils. In the illustrated embodiment, the evaporator 228 also includes multiple rows or series of coiled evaporator tubing 229. In the illustrated embodiment, for example, the evaporator 228 includes four rows or series of coiled evaporator tubing 229. In other embodiments, however, the evaporator 228 can include more or fewer than four rows of evaporator tubing 229. As the cooled liquid refrigerant moves through the evaporator coiled tubing 229, the evaporator 228 evaporates the cooled gas refrigerant. The evaporator 228 returns the cooled gas refrigerant to the compressor 224 to complete the refrigeration cycle. Accordingly, the tubing 229 forms a portion of a refrigerant loop that passes through the foregoing components.

The dehumidifier 100 also includes a heat exchanger 230 adjacent to each of the evaporator 228 and the condenser 226. The heat exchanger 230 can include an air-to-air heat exchanger, a heat exchanger block, or a so-called "x-block." in the illustrated embodiment, the heat exchanger 230 includes multiple separate airflow channels or passages (not shown) that are aligned with each of the evaporator 228 and the condenser 226. The heat exchanger 230 is configured to transfer heat to and from air flowing through the dehumidifier 100, in addition to the heat transfer from the evaporator 228 and the condenser 226. For example, the dehumidifier 100 includes an airflow path 232 along which airflow can travel through the dehumidifier 100. The airflow path 232 enters the upper housing portion 106 at the inlet (or the housing entrance) 110 and continues through the heat exchanger 230 to the evaporator 228 in a first direction (e.g., in a generally vertical direction when the dehumidifier 100 is positioned as shown in FIG. 2). At this portion of the airflow path 232 (i.e., passing through the heat exchanger 230 in the first direction and through the evaporator 228), the heat exchanger 230 and the evaporator 228 cool the airflow to remove moisture from the airflow.

After exiting the evaporator 228 at an evaporator exit 251, interior walls or sections of the lower housing portion 104 and the upper housing portion 106 redirect the airflow path 232 back through the heat exchanger 230 in a second direction generally perpendicular to the first direction toward the condenser 236 (e.g., in a generally horizontal direction when the dehumidifier 100 is positioned as shown in FIG. 2). At this portion of the airflow path 232 (i.e., passing through the heat exchanger 230 in the second direction and through the condenser 226), the heat exchanger 230 and the condenser 226 heat the airflow. After exiting the condenser 226 at a condenser exit 252, interior walls or sections of the housing 102 redirect the airflow path 232 through the lower housing portion 104 to exit the housing 102 via the outlet 112 in the lower housing portion 104. The air mover 114 (e.g., a shrouded impeller, blower, or other suitable air mover) is positioned at the outlet 112 to draw airflow through the dehumidifier 100 along the airflow path 232.

The dehumidifier 100 illustrated in FIG. 2 includes several features that alter the airflow path 232 through the dehumidifier 100 for enhanced moisture removal by the moisture removal components. For example, the dehumidifier 100 includes one or more evaporator airflow directors 236 (identified individually as a first evaporator airflow director 236a and a second evaporator airflow director 236b). The evaporator airflow directors 236 can be plates or flanges that are positioned on opposing front and rear lateral sides of the evaporator 228. For example, in the illustrated embodiment the second evaporator airflow director 236b includes a flange or extension portion 235. The extension portion 235 extends at an angle from the second evaporator airflow director 236b toward the front of the dehumidifier 100, and in a direction extending generally under a rear portion of the evaporator 228 (e.g., at an angle generally extending downwardly and to the left from the evaporator airflow director 236b shown in FIG. 2). The evaporator airflow directors 236, and corresponding flanges such as the extension portion 235, generally cover or enclose opposing lateral sides of the evaporator 228. The evaporator airflow directors 236 extend along the sides of the evaporator 228 in corresponding planes that are generally parallel to the direction of the first portion of the airflow path 232 entering the evaporator 228. Moreover, in the illustrated embodiment each evaporator airflow director 236 spans or extends across all of the corresponding rows or series of the coiled evaporator tubing 229. In other embodiments, however, each evaporator airflow director 236 can span or extend across only a portion of the corresponding rows or series of the coiled evaporator tubing 229. The evaporator airflow directors 236 can be made from metallic, plastic, or other suitable materials for directing airflow or otherwise influencing the airflow path 232 through the evaporator 228.

The dehumidifier 100 illustrated in FIG. 2 also includes one or more condenser airflow directors 238 (identified individually as a first condenser airflow director 238a and a second condenser airflow director 238b). The condenser airflow directors 238 can be plates or flanges that are positioned on opposing upper and lower sides of the condenser 226. In particular embodiments, the condenser airflow directors 238 generally cover or enclose the opposing sides of the condenser 226. The condenser airflow directors 238 extend along the sides of the condenser 226 in corresponding planes that are generally parallel to the direction of the second portion of the airflow path 232 entering the condenser 226. As shown in FIG. 2, each condenser airflow director 238 spans or extends across all of the corresponding rows or series of the coiled condenser tubing 227. In other embodiments, however, each condenser airflow director 238 can span or extend across only a portion of the corresponding rows or series of the coiled condenser tubing 227. The condenser airflow directors 238 can be made from metallic, plastic, or other suitable materials for directing airflow or otherwise influencing the airflow path 232 through the condenser 226.

In operation, as air travels through the dehumidifier 100 along the airflow path 232, the evaporator airflow directors 236 and the condenser airflow directors 238 increase the amount of air that passes through the evaporator coils 229 and the condenser coils 227, respectively. In a conventional device, as airflow passes through the dehumidifier 100, and in particular through the evaporator 228 or the condenser 226, the airflow has the tendency to take the path of least resistance. For example, airflowing through the evaporator 228 may exit the evaporator 228 before passing through all of the rows or series of evaporator coils 229, as illustrated by arrow 233 (shown in broken lines). In the present embodiment, however, the evaporator airflow directors 236 are positioned relative to the evaporator 228 to force or otherwise direct the airflow through all or most of the evaporator coils 229 before allowing the airflow to exit the evaporator 228. For instance, the second evaporator airflow director 236b is positioned at a rear lateral side of the evaporator 228 and at least partially covers, blocks, or otherwise encloses the rear portion of the evaporator 228. In this manner, the second evaporator airflow director 236b blocks the airflow represented by broken arrow 233. For example, the second evaporator airflow director 236b can ensure that air flowing through the rear portion of the evaporator 228 passes through all of the evaporator coils 229 before exiting the rear portion of the evaporator 228, as represented by arrow 240 indicating redirected airflow adjacent to the second evaporator airflow director 236b. The first evaporator airflow director 236a similarly ensures that air flowing through the forward portion of the evaporator 228 does not prematurely exit the forward portion of the evaporator 228 before passing through all of the rows of evaporator coils 229.

The condenser airflow directors 238 control or redirect the air flowing through the condenser 226 in a manner that is generally similar to that of the evaporator airflow directors 236. For example, the second condenser airflow director 238b is positioned at a lower side of the condenser 226 to force or otherwise direct the airflow through all or most of the condenser coils 227 before allowing the airflow to exit the condenser 226. As such, the second condenser airflow director 238b can eliminate or at least partially reduce airflow that would otherwise prematurely exit the lower portion of the condenser 226 as illustrated by arrow 231 (shown in broken lines). Accordingly, the first condenser airflow director 238a can ensure that air flowing through the upper portion of the condenser 226 does not prematurely exit the upper portion of the condenser 226 before passing through all the rows of the condenser coils 227.

The evaporator airflow directors 236 and the condenser airflow directors 238 described above can provide the advantage of increasing the efficiency of the dehumidifier 100 performance. For example, these airflow directors can increase the amount of airflow, as well as the dwell time of the airflow, that passes through the evaporator coils 229 and/or the condenser coils 227. This in turn increases the heat transfer to the airflow from the dehumidifier 100, thereby increasing the moisture removal from the airflow.

Another feature of an embodiment illustrated in FIG. 2 is that the compressor 224 is positioned in the lower housing portion 104 in a heated segment or relatively warmer portion of the airflow path 232. For example, as air passes through the condenser 226, the condenser 226 heats the airflow. The heated airflow then passes into the lower housing portion 104 before exiting the outlet 112 via the air mover 114. The compressor 224, however, is positioned in-line or in the path of the heated airflow in the lower housing portion 104 downstream from the condenser 226. Positioning the compressor 224 at this location provides several advantages for increasing the efficiency of the dehumidifier 100. One advantage, for example, is that the compressor 224 does not have direct thermal communication with airflow flowing through the refrigeration system (e.g., from the inlet 110 through the heat exchanger 230 to the evaporator 228, and then from the evaporator through the heat exchanger 230 to the condenser 226; see FIG. 2). For example, the position of the compressor 224 in the lower housing portion 104 provides thermal separation between the compressor 224 and the heat exchanger 230, evaporator 228 and condenser 226 in the upper housing portion 102. Another advantage, for example, is that although the compressor 224 generates heat during operation, transferring additional heat to the airflow from the compressor 224 enhances or further adds to the heat that the condenser 226 previously added to the airflow. This additional heat added to the airflow from the compressor can be useful in situations where the airflow exiting the dehumidifier 100 is used to dry a flooring surface or other environment. For example, in some embodiments the airflow exiting the outlet 112 of the dehumidifier 100 can be directed to further dry a portion of a flooring surface or otherwise warm the environment where the dehumidifier 100 is being used. In these instances, the compressor 224 can accordingly further heat the exiting airflow to raise the temperature of the airflow and thereby increase the drying characteristics of the exiting airflow.

In the illustrated embodiment, the housing 102 also provides several beneficial features for managing the fluid that is extracted from the air flowing through the dehumidifier. For instance, the lower housing portion 104 includes an integrally formed fluid collector portion or drip tray 242. The drip tray 242 is positioned below the evaporator 228 and is configured to collect or catch the fluid that the evaporator 228 removes from the air. Forming the drip tray 242 as an integral section of the lower housing portion 104 provides several benefits. One advantage, for example, is that the integral drip tray 242 eliminates or reduces any leaks from the collected fluid that may otherwise occur at an interface of two or more mating components that may be joined to form a drip tray. As also noted above, the lower housing portion 104 redirects the airflow path 232 from the evaporator 228 to the heat exchanger 230. The integral drip tray 242 can eliminate or at least partially reduce airflow leaks when redirecting this portion of the airflow path 232 downstream from the evaporator 228. Other advantages of the integral drip tray 242 include the reduced manufacturing and assembly time associated with this portion of the dehumidifier 100, and/or a reduced component cost. An additional advantage of forming the drip tray 242 as an integral section of the lower housing portion 104 is that the integral drip tray 242 increases the stiffness and strength of the lower housing portion 104, as well as of the overall housing 102. The increased stiffness and strength of the lower housing portion 104 and housing 102 is beneficial because the lower housing portion 104, as well as the upper housing portion 106 and the rear housing portion 108, are used as load bearing support structures for the dehumidifier 100.

In the illustrated embodiment, the drip tray 242 includes an upper surface that angles downwardly towards the rear of the dehumidifier 100. The angled drip tray 242 accordingly directs the collected fluid towards the rear portion of the dehumidifier 100. According to an additional feature of the illustrated embodiment, the rear housing portion 108 includes a collection compartment or pump cavity 244. The pump compartment or cavity 244 is an integrally formed section of the rear housing portion 108 and is configured to house a pump 246 (e.g., a condensate pump, submersible or partially submersible pump, or other suitable pump or pump assembly). Accordingly, the pump compartment 244 can form a structural element that supports the housing 102 (e.g., the rear housing portion 108 and/or other housing portions). An advantage of this arrangement is that the pump compartment 244 can provide multiple functions and reduce or eliminate the need for other water collecting, water holding, or general structural elements in the housing 102. The pump cavity 244 is further positioned to receive the collected fluid from the drip tray 242. More specifically, for example, a fluid connector 248 couples the drip tray 242 to the pump cavity 244 to transport the collected fluid from the drip tray 242 to the pump cavity 244. As the pump cavity 244 fills with collected fluid, the pump 246 can discharge the fluid from the housing 102, e.g. when the fluid reaches a predetermined volume or at predetermined time intervals during operation. Additional features and advantages of the rear housing portion 108 and the integral pump cavity 244 are described below with reference to FIG. 3C.

In certain embodiments the fluid connector 248 can have an elongated, looped, or otherwise redirected configuration to heat the fluid passing through the fluid connector 248 prior to dispensing the fluid in the pump cavity 244. For example, the fluid connector 248 can have one or more loops or extensions that pass through the lower housing portion 104 before connecting to the pump cavity 244 at the rear housing portion 108. As explained above, the interior of the lower housing portion 104 is at least partially heated by the airflow entering the lower housing portion 104 from the condenser 226. The compressor 224 additionally generates heat that raises the temperature in the interior of the lower housing portion 104. Accordingly, passing at least a portion of the fluid connector 248 through the lower housing portion 104, and in particular proximate to the compressor 224, can raise the temperature of the fluid passing through the fluid connector 248. The inventors have found, for example, that in certain embodiments redirecting the fluid connector 248 through the lower housing portion 104 in this manner can raise the temperature of the fluid flowing through the fluid connector 248 by approximately 10-15 degrees Fahrenheit.

One advantage of at least partially heating the collected fluid prior to dispensing the collected fluid into the pump cavity 244 is that it can reduce condensation. For example, dispensing relatively cold fluid (e.g., at or near the dew point temperature of the fluid) into the pump cavity 244 of a conventional dehumidifier may cause condensation to form on an outer surface of the housing 102. Such condensation can in turn drip from the housing 102 leaving an undesirable puddle of fluid or other impression that the dehumidifier 100 is leaking. In the illustrated embodiment, however, the fluid collected from the drip tray 242 can be at least partially heated in the fluid connector 248 before the fluid connector 248 dispenses the fluid in the pump cavity 244. Heating the collected fluid in the lower housing portion 104 away from an exterior surface of the housing 102 can accordingly reduce the likelihood of forming condensation on an exterior surface of the rear housing portion 108.

Figure 3A:
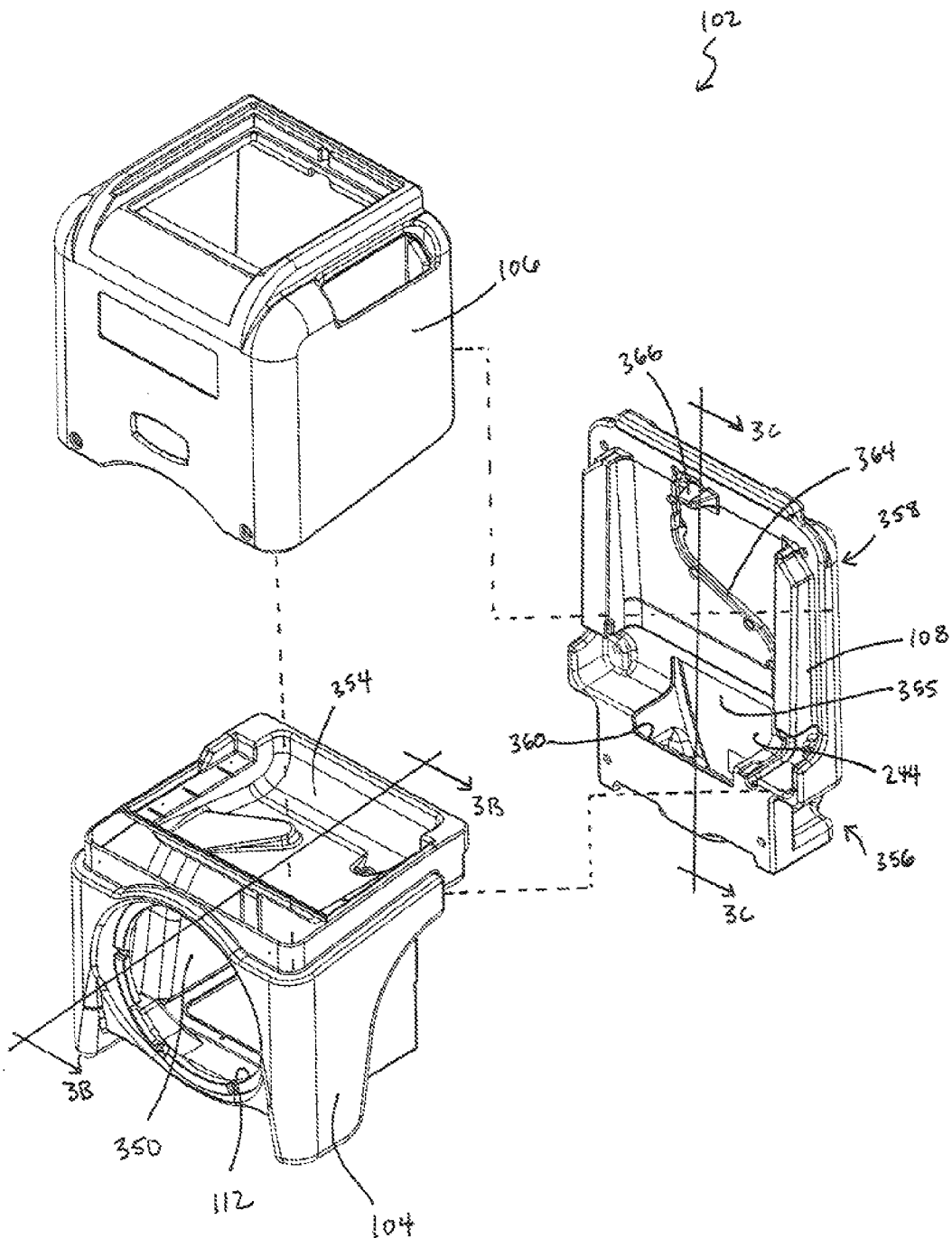
FIG. 3A is an exploded view of a dehumidifier housing assembly configured in accordance with an embodiment of the disclosure.

FIG. 3A is an exploded view of an embodiment of the housing 102 of the dehumidifier 100 described above with reference to FIGS. 1A-2 illustrating the first or lower housing portion 104, the second or upper housing portion 106, and the third or rear housing portion 108. When assembled, these housing portions can be attached to each other and/or the frame 103 (FIG. 1B) via suitable fasteners and with accompanying sealing features (e.g., foam, gaskets, seals, etc.) as are known by those of ordinary skill in the art. In the illustrated embodiment, each of the lower housing portion 104, the upper housing portion 106, and the rear housing portion 108 can be formed or made as separate, integral units. Moreover, these housing portions can be made from plastic materials, such as rotomolded thermoplastics, or other suitable materials.

Figure 3B:
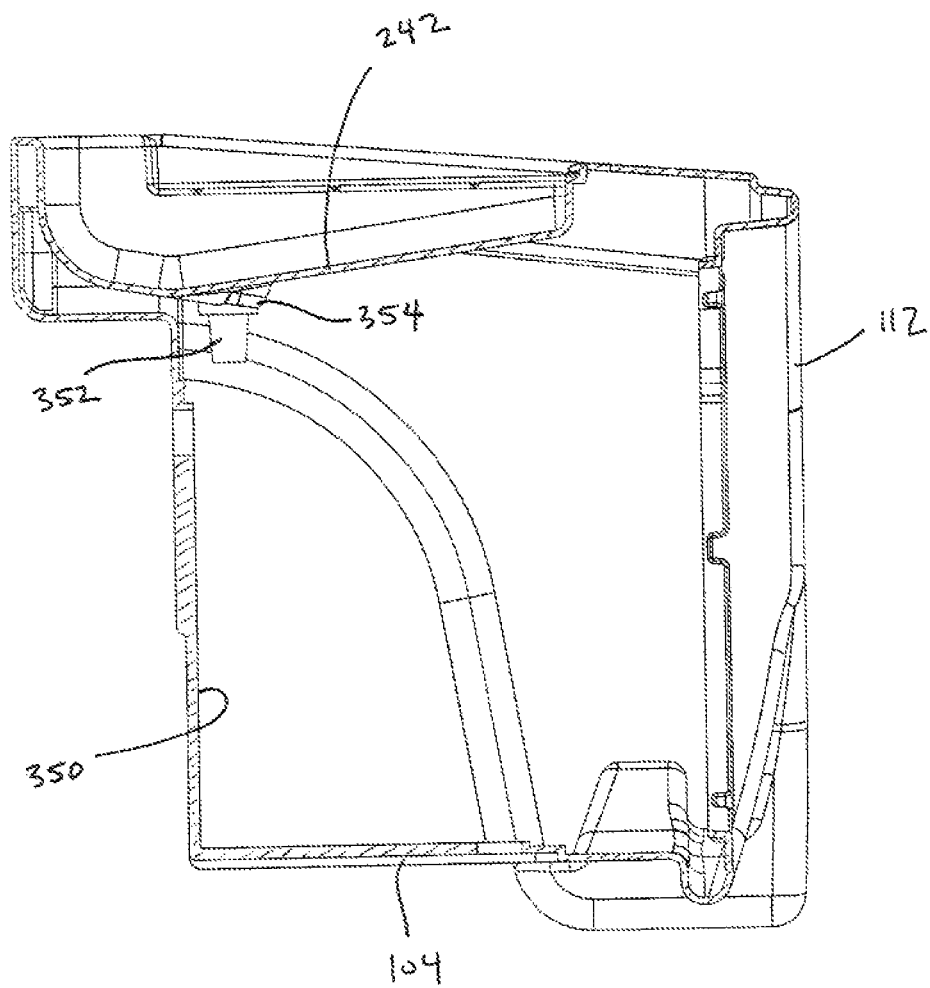
FIG. 3B is a cross-sectional side view taken substantially along lines 33-3B of FIG. 3A.

FIG. 3B is a cross-sectional side view of the lower housing portion 104 taken substantially along lines 38-38 of FIG. 3A. Referring to FIGS. 3A and 38 together, the lower housing portion 104 defines an interior cavity 350 for housing several of the dehumidifier internal components, such as the compressor 224 (FIG. 2), air mover 114 (FIG. 2), and associated components. The lower housing portion 104 further defines the outlet 112 through which airflow exits the dehumidifier 100. In certain embodiments, the lower housing portion 104 can include one or more airflow directors that are integral features of the lower housing portion 104. For example, such integral features of the lower housing portion 104 can form an inlet for the air mover 114 (FIG. 2) that is positioned within the lower housing portion 104. Forming an air mover inlet as an integral feature of the lower housing portion 104 can reduce the manufacturing and assembly time and cost associated with the lower housing portion.

As also shown in illustrated embodiment, the drip tray 242 is an integral feature of the lower housing portion 104. As noted above, the integral drip tray 242 provides several benefits including, for example, an increased strength and stiffness of the lower housing portion 104. In the illustrated embodiment, the drip tray 242 slopes or is angled downwardly and toward the rear of the dehumidifier 100 (e.g., down and to the left in the orientation shown in FIG. 3B) when the dehumidifier 100 is in an operating position to accumulate the collected fluid at a drip tray coupling 352. The drip tray coupling 352 is located at a low spot or depression 354 in the drip tray 242 to ensure that the collected fluid accumulates at the drip tray coupling 352. Moreover, the drip tray coupling 352 is configured to be coupled to the fluid connector 248 to dispense the collected fluid into the pump cavity 244 of the rear housing portion 108 (FIG. 2). The drip tray coupling 352 can also be formed as an integral portion of the drip tray 242 and the lower housing portion 104. Forming the drip tray coupling 352 as an integral feature of the drip tray 242 and/or the lower housing portion 104 can accordingly eliminate or reduce any fluid leaks associated with forming a connection to the drip tray 242.

Figure 3C:
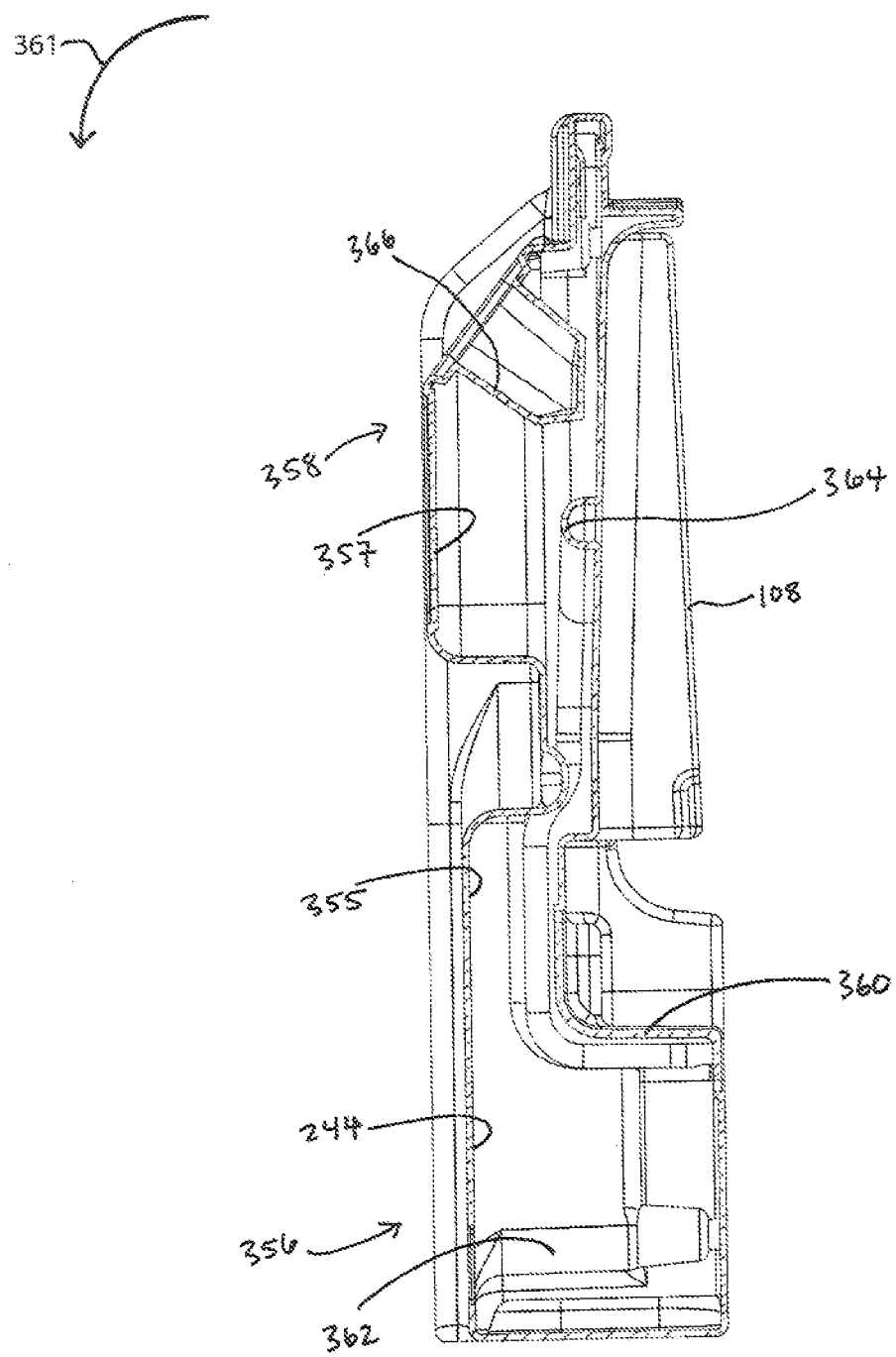
FIG. 3C is a cross-sectional side view taken substantially along lines 3C-3C of FIG. 3A.

FIG. 3C is a cross-sectional side view of the rear housing portion 108 taken substantially along lines 3C-3C of FIG. 3A. Referring to FIGS. 3A and 3C together, the rear housing portion 108 includes an internal cavity 355 extending from a first or lower section 356 of the rear housing portion 108 to a second or upper portion 358 of the rear housing portion 108. The internal cavity 355 is composed of multiple smaller cavities including the pump cavity 244 at the lower section 356, as well as an upper cavity 357 at the upper section 358. As noted above, the pump cavity 244 is configured to receive and support the pump 246 (FIG. 2). For example, the rear housing portion 108 includes an opening 360 at the lower section 356 that provides access into the internal cavity 355 to allow the pump 246 to be positioned within the pump cavity 244. Moreover, the lower section 356 further includes a pump support surface 362 (FIG. 3C) positioned to receive and support the pump 246 (FIG. 2).

In particular embodiments, the rear housing portion 108 is configured to reduce or eliminate the leakage of fluid that accumulates in the pump cavity 244 from the drip tray 242 (FIG. 2). For example, forming the pump cavity 244 and the pump support surface 362 as integral sections of the rear housing portion 108 eliminates any connections (e.g., via seals, gaskets, etc.) that would be used to join two or more parts to support a pump or define an enclosure to hold a pump. Other features of the illustrated embodiment include an the internal cavity 355 having an integral or uninterrupted interior rear surface extending from the lower section 356 to the upper section 358 of the rear housing portion 108. In addition, the pump cavity 244 and the upper cavity 357 can have at least approximately the same or generally similar volumes. As such, when a user moves the dehumidifier 100, for example by pivoting the dehumidifier 100 via the rear wheels 118 (FIGS. 1A and 1B) in a direction generally shown by arrow 361, fluid that is present in the pump cavity 244 does not spill or leak out of the internal cavity 355. For example, fluid contained within the pump cavity 244 can transfer into the upper cavity 357 without leaking from the rear housing portion 108 as the rear housing portion 108 pivots in the direction of arrow 361.

The rear housing portion 108 can additionally include a channel 364 extending across at least the upper section 358 of the rear housing portion 108. The channel 364 can be integrally formed with the rear housing portion 108 and can be positioned to guide wires or connectors, such as low voltage connectors, that extend between the control panel 120 (FIG. 1B) and electrical components positioned within the rear housing portion 108. Forming the channel 364 as an integral part of the rear housing portion 108 provides a shield and/or waterproof protection for the connectors extending through the channel 364. The rear housing portion 108 can further include an integrally formed support or shelf 366 in the upper section 358 that is configured to house one or more sensors for detecting the properties of air flowing through the dehumidifier 100.

FIG. 3D is a cross-sectional side view of a lower housing portion of a dehumidifier configured in accordance with a particular embodiment of the disclosure. As shown in FIG. 3D, the lower housing portion 104 of the housing 112 includes a drip tray 242. In the illustrated embodiment, the drip tray 242 can be formed integrally with the lower housing portion 104. As noted above, the integral drip tray 242 provides several benefits including, for example, an increased strength and stiffness of the lower housing portion 104. As shown in FIG. 3D, a spout 353 can be located at a low spot or depression 354 in the drip tray 242. The collected fluid accumulates in the drip tray 242 and flows to the pump cavity 244 of the rear housing portion 108 (FIG. 2) via the spout 353. As the pump cavity 244 fills with the collected fluid, the pump 246 can discharge the fluid from the housing 102. The spout 353 can transfer collected fluid with impurities or other particles without clogging. This can provide an additional advantage over embodiments that use the flow connector 248 (e.g., a hose) to transfer water between the drip tray 242 and the pump cavity 244 (e.g., a pump basin) by eliminating a component and the associated time required to install and potentially maintain it.

Figure 3E:
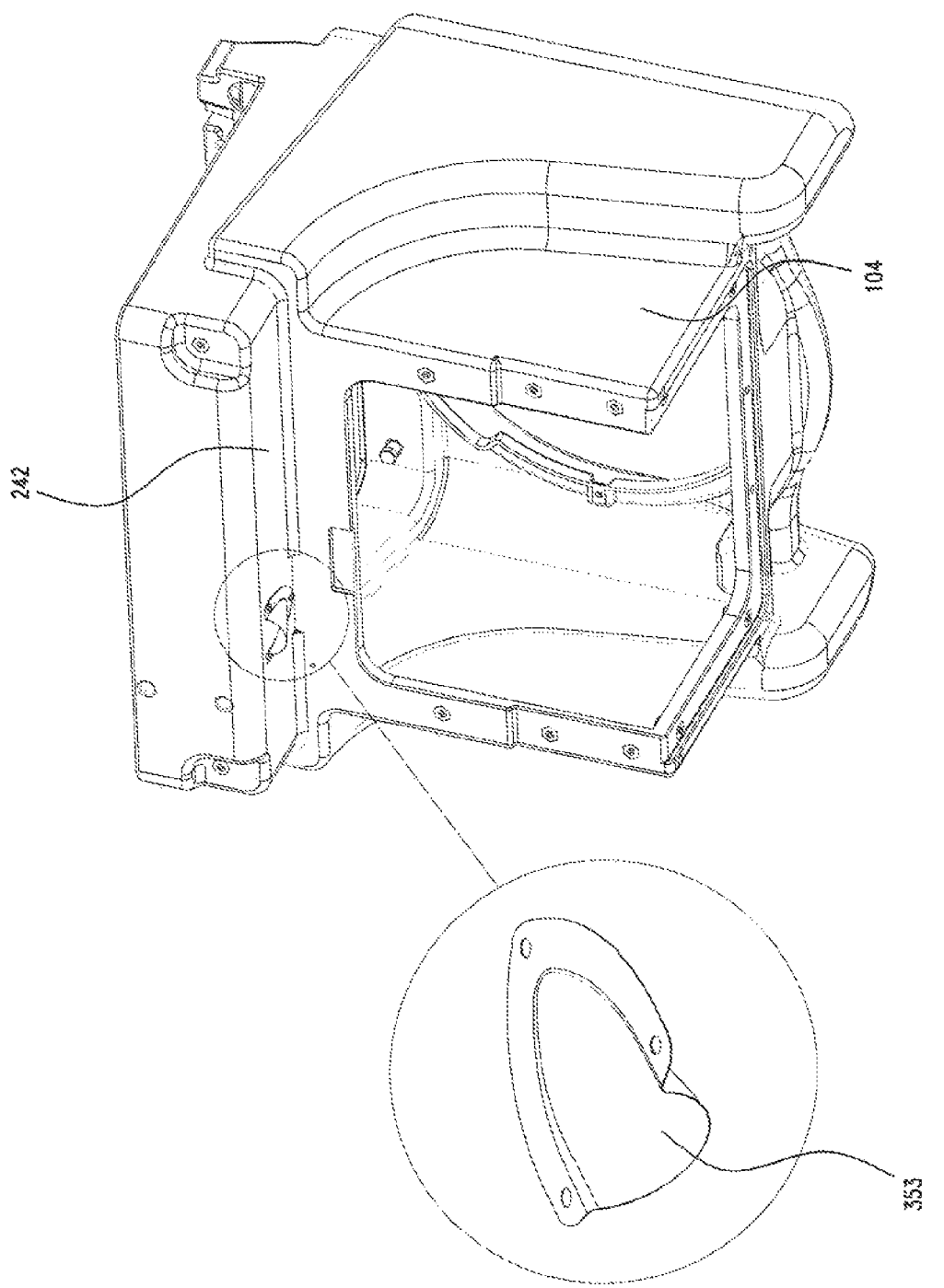
FIG. 3E is a bottom isometric view of a dehumidifier housing portion configured in accordance with an embodiment of the disclosure.

FIG. 3E is a bottom isometric view of a dehumidifier lower housing portion 104 configured in accordance with an embodiment of the disclosure. In the illustrated embodiment, the spout 353 can be attached to the lower housing portion 104 by screws, bolts, or other suitable connectors. In other embodiments, the spout 353 can also be formed as an integral portion of the drip tray 242 and the lower housing portion 104. Forming the spout 353 as an integral feature of the drip tray 242 and the lower housing portion 104 can accordingly eliminate or reduce fluid leaks associated with forming a connection to the drip tray 242. This may also reduce manufacturing costs.

FIG. 4A is an isometric view of a heat exchanger 230 of a dehumidifier configured in accordance with an embodiment of the disclosure. As shown in FIG. 4A, the heat exchanger 230 is positioned adjacent to the evaporator 228 and the condenser 226. The airflow path 232 flows through the heat exchanger 230 (during a pre-cool process) to the evaporator 228 in a first direction (e.g., D1 FIG. 4A) and then flows through the heat exchanger 230 (during a pre-heat process) to the condenser 226 in a second direction (e.g., D2 in FIG. 4A). The two flow paths are in thermal communication within the neat exchanger 230 but do not mix. In the illustrated embodiment, the heat exchanger 230 can include a corner blocking component 401 positioned at the corner of the heat exchanger 230. The corner blocking component 401 can direct the airflow within the heat exchanger 230 and prevent air from leaking, e.g., from one flow path to the other. The corner blocking component 401 can be attached to the heat exchanger 230 by glue, adhesives, or other suitable arrangements. The heat exchanger 230 can have a notch 402 to accommodate the corner blocking component 401. Additional aspects of the heat exchanger 230 and the corner blocking component 401 are included in U.S. Provisional Application No. 61/547,613, filed Oct. 14, 2011, and previously incorporated herein by reference.

FIG. 4B is an isometric view of a dehumidifier 400 configured in accordance with an embodiment of the disclosure. FIG. 4B shows the dehumidifier 400 with the upper housing portion 106 (FIG. 1A) removed so that the heat exchanger 230 is visible. FIG. 4C illustrates an enlarged portion of the heat exchanger 230. As shown in FIG. 4C, the heat exchanger 230 can include a first corner blocking component 401a (generally similar to the blocking component 401 described above with reference to FIG. 4A), and a second corner blocking component 401b at another corner of the heat exchanger 230, to further direct the airflow within the heat exchanger 230. In addition, the second corner blocking component 401b can prevent undesirable airflow leakage around the sides of the heat exchanger 230, as indicated by arrow L1. In the illustrated embodiment, the heat exchanger 230 can include a flexible T-shaped third blocking component 401c positioned and shaped to direct the air flowing from the heat exchanger 230 to the condenser 226. The third blocking component 401c can be made of any suitable heat insulation material. The third blocking component 401c can be positioned between the heat exchanger 230 and the condenser 226 to create a substantially airtight flow path for the passing airflow. In particular, the third blocking component 401c can prevent undesirable airflow leakage from the condenser 226 around the side of the heat exchanger 230, as indicated by arrow L2. The third blocking component 401c can effectively prevent undesirable heat exchange between the evaporator 228 (FIG. 4B), which is at a relatively low temperature and the condenser 226, which is at a relatively high temperature, in addition to or in lieu of preventing or at least restricting airflow along the leak path, indicated by arrow L2. The foregoing features alone or in combination can further improve the overall efficiency of the dehumidifier 400.

From the foregoing, it will be appreciated that specific embodiments of the disclosure have been described herein for purposes of illustration, but that various modifications may be made without deviating from the scope of the disclosure. For example, although three separate housing portions are described above, in other embodiments more or less housing portions may be combined to form the housing or cover without deviating from the disclosure. In addition, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the disclosure. Accordingly, the disclosure can include other embodiments not expressly shown or described above.

We claim:

1. A dehumidifier comprising:
 a housing at least partially defining an airflow path extending therethrough;
 a moisture removal component positioned within the housing along a portion of the airflow path, wherein the airflow path enters the moisture removal component in a first direction; and
 an airflow director adjacent to the moisture removal component extending in a plane that is generally parallel to the first direction.

2. A dehumidifier comprising:
 a housing at least partially defining an airflow path extending therethrough;
 a moisture removal component positioned within the housing along a portion of the airflow path, wherein the airflow path enters the moisture removal component in a first direction; and
 an airflow director adjacent to the moisture removal component extending in a plane that is generally parallel to the first direction, wherein:
 the moisture removal component includes multiple rows of coiled tubing; and
 the airflow director extends across the rows of coiled tubing and is positioned to direct airflow through at least a portion of each of the individual coils of tubing.

3. A dehumidifier comprising:
 a housing at least partially defining an airflow path extending therethrough;
 a moisture removal component positioned within the housing along a portion of the airflow path, wherein the airflow path enters the moisture removal component in a first direction;
 an airflow director adjacent to the moisture removal component extending in a plane that is generally parallel to the first direction; and
 a fluid collector at least partially defined by the housing and positioned adjacent to the moisture removal component to collect the moisture removed from the airflow.

4. The dehumidifier of claim 3 wherein the fluid collector is integrally formed with a lower housing portion.

5. The dehumidifier of claim 3 wherein the fluid collector includes an upper surface extending downwardly towards a rear housing portion, and wherein the fluid collector accordingly directs the moisture removed from the airflow path to a collection compartment of the rear housing portion.

6. The dehumidifier of claim 5 wherein the moisture removed from the airflow path is directed to the collection compartment via a drip tray coupling and a fluid connector, and wherein the fluid connector selectively heats the moisture removed from the airflow.

7. The dehumidifier of claim 5 wherein the moisture removed from the airflow path is directed to the collection compartment via a spout.

8. The dehumidifier of claim 5 wherein a pump is positioned within the collection compartment to discharge the moisture removed from the airflow path.

9. A dehumidifier comprising:
 a housing at least partially defining an airflow path extending therethrough;
 a moisture removal component positioned within the housing along a portion of the airflow path, wherein the airflow path enters the moisture removal component in a first direction; and
 an airflow director adjacent to the moisture removal component extending in a plane that is generally parallel to the first direction;
 wherein the airflow director include an extension portion extending an angle from the airflow director.

10. A dehumidifier comprising:
 a housing at least partially defining an airflow path extending therethrough;
 a moisture removal component positioned within the housing along a portion of the airflow path, wherein the airflow path enters the moisture removal component in a first direction;
 an airflow director adjacent to the moisture removal component extending in a plane that is generally parallel to the first direction; and
 a heat exchanger positioned in the airflow path adjacent to the moisture removal component, wherein the heat exchanger includes a blocking component positioned to prevent airflow leakage around a side of the heat exchanger.

11. A dehumidifier comprising:
 a housing at least partially defining an airflow path extending therethrough;
 a moisture removal component positioned within the housing along a portion of the airflow path, wherein the airflow path enters the moisture removal component in a first direction;
 an airflow director adjacent to the moisture removal component extending in a plane that is generally parallel to the first direction;
 a condenser positioned in the airflow path downstream from the moisture removal component, wherein the airflow director is a first airflow director; and
 a second airflow director extending substantially in a plane that is generally parallel to a second direction substantially perpendicular to the first direction.

12. A dehumidifier comprising:
 a moisture removal component positioned to remove fluid from a flow of air;
 a housing covering at least a portion of the moisture removal component, wherein the housing includes an integral compartment that is positioned to receive the fluid removed from the flow of air and forms a structural element supporting the housing; and
 a pump positioned within the compartment to discharge the fluid from the housing.

13. The dehumidifier of claim 12 wherein the compartment is defined by one or more internal wall portions of the housing.

14. The dehumidifier of claim 12, further comprising a fluid collector at least partially defined by the housing and positioned adjacent to the moisture removal component to collect the fluid removed from the air.

15. The dehumidifier of claim 14 wherein the fluid collector includes an upper surface extending downwardly towards a rear housing portion, and wherein the fluid collector accordingly directs the fluid removed from the air to the compartment positioned in the rear housing portion.

16. The dehumidifier of claim 15 wherein the fluid removed from the air is directed to the compartment via a drip tray coupling and a fluid connector, and wherein the fluid connector selectively heats the fluid removed from the air.

17. The dehumidifier of claim 15, further comprising a spout positioned to direct fluid from the fluid collector into the compartment.

18. The dehumidifier of claim 12, further comprising a heat exchanger positioned adjacent to the moisture removal component, wherein the heat exchanger includes a blocking component positioned to prevent airflow leakage around an outside surface of the heat exchanger.

19. A dehumidifier comprising:
a housing at least partially enclosing an airflow path and having a housing entrance and a housing exit;
an evaporator positioned along the airflow path and having an evaporator exit; and
a condenser positioned along the airflow path downstream from the evaporator and having a condenser exit;
wherein the airflow path includes—
a cooling section between the housing entrance and the evaporator exit, wherein an airflow in the cooling section is cooled by the evaporator; and
a heating section between the evaporator exit and the condenser exit, wherein the airflow in the heating section is heated by the condenser; and wherein the dehumidifier further comprises:
a compressor coupled to the evaporator and the condenser with a refrigerant loop, wherein the compressor is positioned out of direct thermal communication with airflow in both the cooling section and the heating section.

20. The dehumidifier of claim 19, further comprising:
a fluid collector positioned proximate to the evaporator to accumulate fluid that is removed from at least the inlet section of the airflow;
a pump spaced apart from the fluid collector to discharge the accumulated fluid from the housing, wherein the pump is separated from the airflow path; and
a fluid connector extending from the fluid collector to the pump.

21. The dehumidifier of claim 20, wherein the housing includes an upper housing portion, a lower housing portion below the upper housing portion, and a rear housing portion behind at least part of at least one of the upper housing portion and the lower housing portion, and wherein the compressor is positioned in the lower housing portion, the pump is positioned in the rear housing portion, and a heat exchanger is positioned in the upper portion.

22. The dehumidifier of claim 19, further comprising a heat exchanger positioned in the airflow path adjacent to the moisture removal component, wherein the heat exchanger includes a blocking component positioned to prevent airflow leakage around an outer surface of the heat exchanger.

23. The dehumidifier of claim 19 wherein the compressor is positioned along the airflow path between the condenser exit and the housing exit.

* * * * *

UNITED STATES PATENT AND TRADEMARK OFFICE
CERTIFICATE OF CORRECTION

PATENT NO.       : 9,205,374 B2
APPLICATION NO.  : 13/599826
DATED            : December 8, 2015
INVENTOR(S)      : Richard A. Black et al.

Page 1 of 1

It is certified that error appears in the above-identified patent and that said Letters Patent is hereby corrected as shown below:

In the specification,

In column 1, line 11, delete "of" and insert -- both of --, therefor.

In column 3, line 55, delete "in" and insert -- In --, therefor.

In column 7, line 25, delete "e.g." and insert -- e.g., --, therefor.

In column 8, line 17, delete "38-38" and insert -- 3B-3B --, therefor.

In column 9, line 13, delete "an the" and insert -- an --, therefor.

In column 10, line 21, delete "neat" and insert -- heat --, therefor.

Signed and Sealed this
Twenty-ninth Day of March, 2016

Michelle K. Lee
*Director of the United States Patent and Trademark Office*